US012640481B2

(12) United States Patent (10) Patent No.: US 12,640,481 B2
Nishio (45) Date of Patent: May 26, 2026

(54) MULTILAYER SUBSTRATE

(71) Applicant: Murata Manufacturing Co., Ltd.,
Nagaokakyo (JP)

(72) Inventor: Kosuke Nishio, Nagaokakyo (JP)

(73) Assignee: MURATA MANUFACTURING CO.,
LTD., Nagaokakyo (JP)

( * ) Notice: Subject to any disclaimer, the term of this
patent is extended or adjusted under 35
U.S.C. 154(b) by 0 days.

(21) Appl. No.: 19/172,708

(22) Filed: Apr. 8, 2025

(65) Prior Publication Data

US 2025/0239772 A1 Jul. 24, 2025

Related U.S. Application Data

(63) Continuation of application No.
PCT/JP2023/029138, filed on Aug. 9, 2023.

(30) Foreign Application Priority Data

Oct. 18, 2022 (JP) ................................. 2022-166830

(51) Int. Cl.
B32B 3/10 (2006.01)
B32B 15/08 (2006.01)
H01Q 9/04 (2006.01)
(52) U.S. Cl.
CPC ........... H01Q 9/0414 (2013.01); B32B 15/08
(2013.01); B32B 2305/55 (2013.01); B32B
2307/202 (2013.01); B32B 2307/206
(2013.01); B32B 2457/00 (2013.01)
(58) Field of Classification Search
None
See application file for complete search history.

(56) References Cited

U.S. PATENT DOCUMENTS

| 6,069,587 A | 5/2000 | Lynch et al. | |
| 2002/0163468 A1 | 11/2002 | Anderson | |
| 2015/0130669 A1* | 5/2015 | Sonoda .................. | H01Q 5/378 |
| | | | 343/702 |

(Continued)

FOREIGN PATENT DOCUMENTS

| EP | 700117 A1 | 3/1996 |
| JP | 2000-261235 A | 9/2000 |

(Continued)

OTHER PUBLICATIONS

International Search Report and Written Opinion mailed on Oct. 31,
2023, received for PCT Application PCT/JP2023/029138, filed on
Aug. 9, 2023, 10 pages including English Translation.

*Primary Examiner* — Christopher M Polley
(74) *Attorney, Agent, or Firm* — XSENSUS LLP

(57) ABSTRACT

When viewed in a negative direction of a Z-axis, a radiation
conductor layer region in which a radiation conductor layer
is provided includes a ground conductor layer non-forming
region in which one or more first ground conductor layers
are not provided. When viewed in the negative direction of
the Z-axis, a signal conductor layer includes an overlapping
portion overlapping the ground conductor layer non-forming
region. In the ground conductor layer non-forming region, a
conductor entirely covering the ground conductor layer
non-forming region is not present on a positive side of the
Z-axis relative to the signal conductor layer, except for the
radiation conductor layer.

20 Claims, 7 Drawing Sheets

(56) References Cited

U.S. PATENT DOCUMENTS

2017/0194692 A1* 7/2017 Sayama ................... H01Q 9/42
2020/0388918 A1* 12/2020 Leung ................... H01Q 9/285

FOREIGN PATENT DOCUMENTS

JP        2002-290144 A     10/2002
JP          2005150876 A   *  6/2005   ............ H01Q 1/243
JP        2016-127481 A      7/2016

* cited by examiner

10d

MULTILAYER SUBSTRATE

CROSS-REFERENCE TO RELATED APPLICATIONS

This is a continuation application of PCT/JP2023/029138, filed on Aug. 9, 2023, designating the United States of America, which is based on and claims priority to Japanese Patent Application No. JP 2022-166830 filed on Oct. 18, 2022. The entire contents of the above-identified applications, including the specifications, drawings and claims, are incorporated herein by reference in their entirety.

TECHNICAL FIELD

The present disclosure relates to a multilayer substrate.

BACKGROUND ART

As an disclosure related to a conventional multilayer substrate, for example, a microstrip antenna described in Patent Document 1 is known. The microstrip antenna includes a ground conductor, a center conductor, and a radiation conductor. The center conductor is located below the ground conductor. The radiation conductor is located on the ground conductor. The ground conductor is provided with a slot. The slot overlaps the radiation conductor and the center conductor assuming viewed in a downward direction. Thus, the radiation conductor is electromagnetically coupled to the ground conductor.

CITATION LIST

Patent Document

Patent Document 1: Japanese Unexamined Patent Application Publication No. 2000-261235

SUMMARY OF DISCLOSURE

Technical Problem

Now, in the microstrip antenna disclosed in Patent Document 1, there is a demand for easy adjustment of an input impedance to the antenna. Thus, adding a matching circuit to the microstrip antenna may be considered. However, assuming a matching circuit is added to the microstrip antenna, it may be difficult to maintain symmetry of radiation characteristics and reception characteristics of the microstrip antenna.

Thus, a feature of the present disclosure is to provide a multilayer substrate that allows easy adjustment of an input impedance to a radiation conductor layer and that can suppress reductions in symmetry of radiation characteristics and reception characteristics of the radiation conductor layer.

Solution to Problem

An embodiment of the present disclosure provides a multilayer substrate including a multilayer body, a radiation conductor layer, one or more first ground conductor layers, a signal conductor layer, a first branch conductor layer, and a second branch conductor layer, wherein the multilayer body has a structure in which a plurality of insulator layers are laminated along a Z-axis, the radiation conductor layer is provided at the multilayer body, the one or more first ground conductor layers are provided at the multilayer body, overlap the radiation conductor layer assuming viewed in a negative direction of the Z-axis, and are located on a negative side of the Z-axis relative to the radiation conductor layer, the signal conductor layer is provided at the multilayer body, overlaps the radiation conductor layer and the one or more first ground conductor layers assuming viewed in the negative direction of the Z-axis, is located on the negative side of the Z-axis relative to the radiation conductor layer and the one or more first ground conductor layers, and is not electrically connected to the radiation conductor layer, a ground conductor layer non-forming region in which the one or more first ground conductor layers are not provided is present in a radiation conductor layer region in which the radiation conductor layer is provided assuming viewed in the negative direction of the Z-axis, the signal conductor layer includes an overlapping portion overlapping the ground conductor layer non-forming region assuming viewed in the negative direction of the Z-axis, in the ground conductor layer non-forming region, a conductor entirely covering the ground conductor layer non-forming region is not present on a positive side of the Z-axis relative to the signal conductor layer, except for the radiation conductor layer, the first branch conductor layer and the second branch conductor layer are provided at the multilayer body and are electrically connected to the signal conductor layer, and assuming viewed in the negative direction of the Z-axis, a virtual line that passes through the overlapping portion and at which the first branch conductor layer and the second branch conductor layer are line-symmetrical to each other is present.

Advantageous Effects of Disclosure

According to the multilayer substrate of the present disclosure, an input impedance to the radiation conductor layer in the band of a high-frequency signal that is transmitted/received by the radiation conductor layer can be easily adjusted, and reductions in symmetry of radiation characteristics and reception characteristics of the radiation conductor layer can be suppressed.

BRIEF DESCRIPTION OF DRAWINGS

FIG. 4 is an exploded perspective view of a multilayer substrate 10a.

DESCRIPTION OF EMBODIMENTS

Embodiment

[Structure of Multilayer Substrate]

Figure 1:
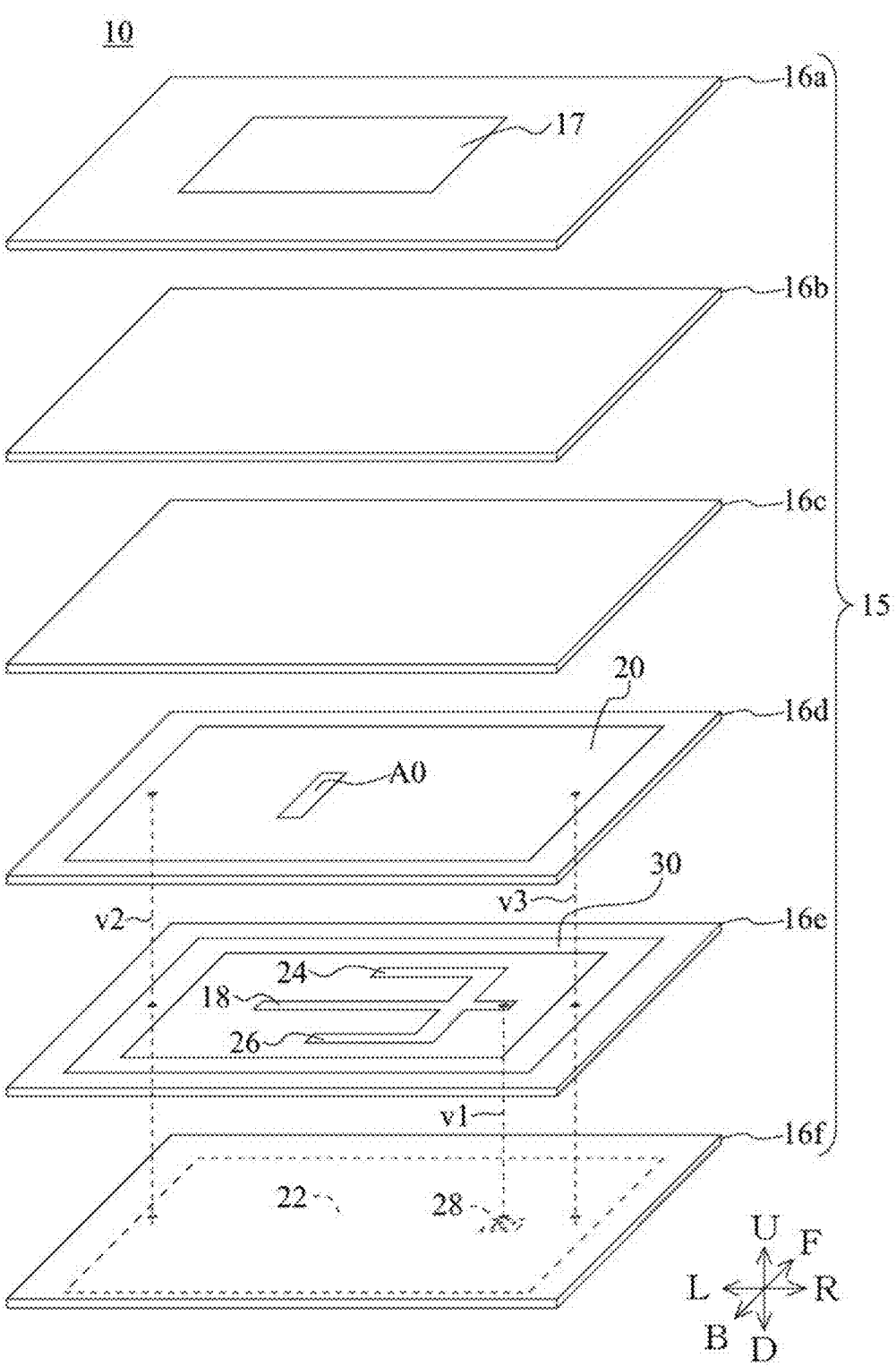
FIG. 1 is an exploded perspective view of a multilayer substrate 10.
Figure 2:
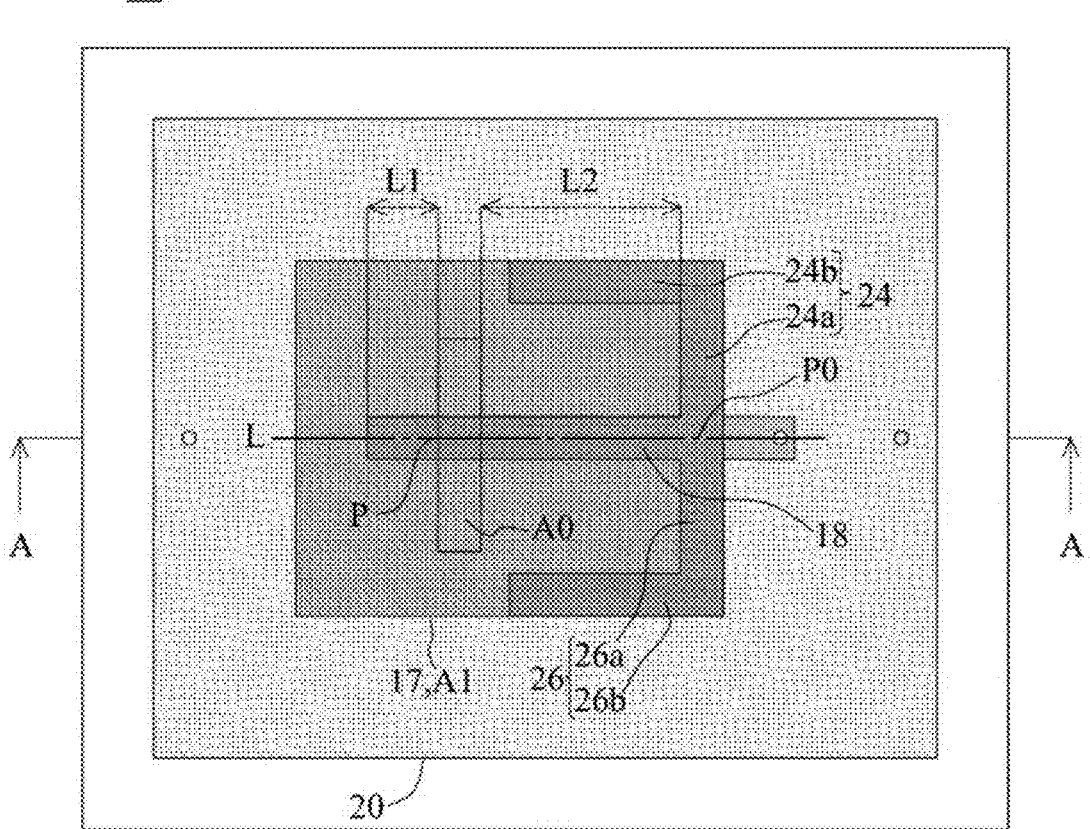
FIG. 2 is a top view of the multilayer substrate 10.
Figure 3:
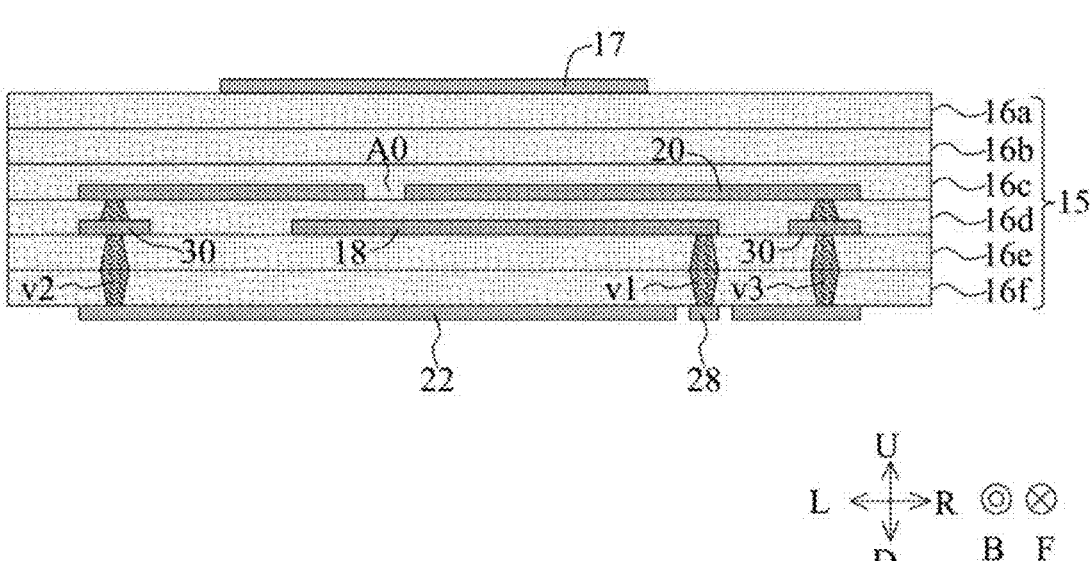
FIG. 3 is a cross-sectional view of the multilayer substrate 10.

A structure of a multilayer substrate 10 according to an embodiment of the present disclosure will be described below with reference to the drawings. FIG. 1 is an exploded perspective view of a multilayer substrate 10. FIG. 2 is a top view of the multilayer substrate 10. FIG. 3 is a cross-sectional view of the multilayer substrate 10. FIG. 3 is a cross-sectional view taken along a line A-A in FIG. 2.

In the present specification, directions are defined as follows. A direction in which insulator layers 16a to 16f are aligned in this order is defined as a downward direction. The downward direction coincides with a negative direction of a Z-axis. Assuming viewed in the downward direction, two sides of a multilayer body 15 extend along a front-rear axis. The front-rear axis coincides with a Y-axis. The remaining two sides of the multilayer body 15 extend along a right-left axis. The right-left axis coincides with an X-axis. The up-down axis (Z-axis), the front-rear axis (Y-axis), and the right-left axis (X-axis) are orthogonal to each other. Note that the up-down axis, the front-rear axis, and the right-left axis in the present embodiment may or may not coincide with an up-down axis, a front-rear axis, and a right-left axis assuming the multilayer substrate 10 is used.

First, the structure of the multilayer substrate 10 will be described with reference to FIG. 1 to FIG. 3. The multilayer substrate 10 is an antenna module to be incorporated in an electronic device such as a wireless communication terminal. As illustrated in FIG. 1, the multilayer substrate 10 includes the multilayer body 15, a radiation conductor layer 17, a signal conductor layer 18, a first ground conductor layer 20, a second ground conductor layer 22, an outer electrode 28, an annular ground conductor layer 30, and interlayer connection conductors v1 to v3.

The multilayer body 15 has a plate shape. The multilayer body 15 has a rectangular shape assuming viewed in a downward direction. The multilayer body 15 has a structure in which insulator layers 16a to 16f are laminated along the up-down axis (Z-axis). The insulator layers 16a to 16f are aligned in this order in the downward direction. The insulator layers 16a to 16f are fused between adjacent ones. A material of the insulator layers 16a to 16f is a thermoplastic resin. The thermoplastic resin is, for example, a liquid crystal polymer.

The radiation conductor layer 17 is provided at the multilayer body 15. In the present embodiment, the radiation conductor layer 17 is located on an upper main surface of the multilayer body 15. Thus, the radiation conductor layer 17 is located on the upper main surface of the insulator layer 16a. The radiation conductor layer 17 has a rectangular shape assuming viewed in the downward direction. Note that the radiation conductor layer 17 may have a square shape assuming viewed in the downward direction. Assuming viewed in the downward direction, two sides of the radiation conductor layer 17 extend along the front-rear axis. The remaining two sides of the radiation conductor layer 17 extend along the right-left axis.

The first ground conductor layer 20 is provided at the multilayer body 15. In the present embodiment, the first ground conductor layer 20 is located on an upper main surface of the insulator layer 16d. Thus, the first ground conductor layer 20 is located below the radiation conductor layer 17 (on the negative side of the Z-axis). The first ground conductor layer 20 covers most of the upper main surface of the insulator layer 16d. Thus, the first ground conductor layer 20 overlaps the radiation conductor layer 17 assuming viewed in the downward direction. The first ground conductor layer 20 described above is connected to a ground potential.

The signal conductor layer 18 is provided at the multilayer body 15. In the present embodiment, the signal conductor layer 18 is located on an upper main surface of the insulator layer 16e. Thus, the signal conductor layer 18 is located below (on the negative side of the Z-axis) the radiation conductor layer 17 and the first ground conductor layer 20. The signal conductor layer 18 overlaps the first ground conductor layer 20 and the radiation conductor layer 17 assuming viewed in the downward direction (negative direction of the Z-axis). However, the signal conductor layer 18 is not electrically connected to the radiation conductor layer 17 and the first ground conductor layer 20. The signal conductor layer 18 has a linear shape extending along the right-left axis (X-axis). Thus, the signal conductor layer 18 has a left end (first end) and a right end. A high-frequency signal is transmitted into the signal conductor layer 18 described above.

The second ground conductor layer 22 is provided at the multilayer body 15. In the present embodiment, the second ground conductor layer 22 is located on a lower main surface of the insulator layer 16f. Thus, the second ground conductor layer 22 is located below the signal conductor layer 18 (on the negative side of the Z-axis). The second ground conductor layer 22 covers most of the lower main surface of the insulator layer 16f. Thus, the second ground conductor layer 22 overlaps the radiation conductor layer 17 and the signal conductor layer 18 assuming viewed in the downward direction. The second ground conductor layer 22 described above is connected to the ground potential.

Each of the signal conductor layer 18, the first ground conductor layer 20, and the second ground conductor layer 22 described above has a strip line structure.

The outer electrode 28 is provided at the multilayer body 15. In the present embodiment, the outer electrode 28 is located on the lower main surface of the insulator layer 16f. However, the outer electrode 28 is not in contact with the second ground conductor layer 22. The outer electrode 28 has a rectangular shape assuming viewed in the downward direction. The outer electrode 28 overlaps a right end portion of the signal conductor layer 18 assuming viewed in the downward direction. The outer electrode 28 is connected to an electrode of a circuit board by soldering.

The annular ground conductor layer 30 is provided at the multilayer body 15. In the present embodiment, the annular ground conductor layer 30 is located on the upper main surface of the insulator layer 16e. The annular ground conductor layer 30 has a rectangular annular shape assuming viewed in the downward direction. The signal conductor layer 18 is located within a region surrounded by the annular ground conductor layer 30 assuming viewed in the downward direction. The annular ground conductor layer 30 is connected to the ground potential.

The interlayer connection conductor v1 electrically connects the signal conductor layer 18 and the outer electrode 28. The interlayer connection conductor v1 penetrates through the insulator layers 16e and 16f along the up-down axis. An upper end of the interlayer connection conductor v1 is in contact with a right end portion of the signal conductor layer 18. A lower end of the interlayer connection conductor v1 is in contact with the outer electrode 28.

The interlayer connection conductors v2 and v3 electrically connect the first ground conductor layer 20, the second ground conductor layer 22, and the annular ground conductor layer 30. The interlayer connection conductors v2 and v3 penetrate through the insulator layers 16d to 16f along the up-down axis. Upper ends of the interlayer connection conductors v2 and v3 are in contact with the first ground conductor layer 20. Lower ends of the interlayer connection conductors v2 and v3 are in contact with the second ground conductor layer 22. Intermediate portions of the interlayer connection conductors v2 and v3 are in contact with the annular ground conductor layer 30.

Now, as illustrated in FIG. 2, a region in which the radiation conductor layer 17 is provided assuming viewed in the downward direction (negative direction of the Z-axis) is defined as a radiation conductor layer region A1. Assuming viewed in the downward direction (negative direction of the Z-axis), the radiation conductor layer region A1 includes a ground conductor layer non-forming region A0 in which the first ground conductor layer 20 is not provided. The ground conductor layer non-forming region A0 is surrounded by the first ground conductor layer 20 assuming viewed in the downward direction (negative direction of the Z-axis). To be specific, the ground conductor layer non-forming region A0 has a rectangular shape assuming viewed in the downward direction. Two long sides of the ground conductor layer non-forming region A0 extend in the front-rear direction. Two short sides of the ground conductor layer non-forming region A0 extend in the right-left direction. A length of the ground conductor layer non-forming region A0 in a direction along the front-rear axis (Y-axis) is equal to or less than ¼ of the wavelength of a high-frequency signal that is transmitted through the signal conductor layer 18. This suppresses the occurrence of unwanted resonance in the ground conductor layer non-forming region A0, thereby suppressing the occurrence of noise.

The ground conductor layer non-forming region A0 intersects the signal conductor layer 18 assuming viewed in the downward direction. In the present embodiment, the ground conductor layer non-forming region A0 is orthogonal to the signal conductor layer 18 assuming viewed in the downward direction. Thus, the signal conductor layer 18 overlaps the ground conductor layer non-forming region A0 assuming viewed in the downward direction (negative direction of the Z-axis). That is, assuming viewed in the downward direction (negative direction of the Z-axis), the signal conductor layer 18 includes an overlapping portion P overlapping the ground conductor layer non-forming region A0. Then, assuming viewed in the downward direction (negative direction of the Z-axis), a length L1 of the signal conductor layer 18 between the left end (first end) of the signal conductor layer 18 and the overlapping portion P is equal to or less than ¼ of the wavelength of the high-frequency signal that is transmitted through the signal conductor layer 18. This suppresses the occurrence of unwanted resonance in the signal conductor layer 18 between the left end of the signal conductor layer 18 and the overlapping portion P, thereby suppressing the occurrence of noise.

Assuming viewed in the downward direction (negative direction of the Z-axis), the signal conductor layer 18 overlaps the radiation conductor layer 17 in the ground conductor layer non-forming region A0. That is, the overlapping portion P overlaps the radiation conductor layer 17 assuming viewed in the downward direction. Additionally, as illustrated in FIG. 3, in the ground conductor layer non-forming region A0, above the signal conductor layer 18 (on the positive side of the Z-axis), no conductor layer that entirely covers the ground conductor layer non-forming region A0 is present, except for the radiation conductor layer 17. Thus, the signal conductor layer 18 and the radiation conductor layer 17 are electromagnetically coupled to each other. In the present embodiment, the signal conductor layer 18 and the radiation conductor layer 17 are mainly magnetically coupled to each other. As a result, a high-frequency signal transmitted through the signal conductor layer 18 is transmitted to the radiation conductor layer 17 by an electromagnetic field through the ground conductor layer non-forming region A0. Then, a standing wave of the high-frequency signal is generated at the radiation conductor layer 17. The radiation conductor layer 17 radiates an electromagnetic wave of the high-frequency signal in an upward direction. Note that the radiation conductor layer 17 receives an electromagnetic wave of a high-frequency signal based on a similar or the same principle.

Now, the multilayer substrate 10 further includes a first branch conductor layer 24 and a second branch conductor layer 26. The first branch conductor layer 24 and the second branch conductor layer 26 are provided at the multilayer body 15. In the present embodiment, the first branch conductor layer 24 and the second branch conductor layer 26 are located on the upper main surface of the insulator layer 16e. Each of the first branch conductor layer 24 and the second branch conductor layer 26 has an L shape assuming viewed in the downward direction. More specifically, the first branch conductor layer 24 includes a first portion 24a and a second portion 24b. The first portion 24a extends in the front-rear direction. A rear end of the first portion 24a is connected to a connection point P0 of the signal conductor layer 18. The connection point P0 is located between the left end and the right end of the signal conductor layer 18. In the present embodiment, a transmission path length L2 of the high-frequency signal from the overlapping portion P to the connection point P0 is shorter than half the wavelength of the high-frequency signal. That is, the transmission path length L2 of the high-frequency signal from the overlapping portion P to the first branch conductor layer 24 is shorter than half the wavelength of the high-frequency signal. The second portion 24b extends in the right-left direction. The right end of the second portion 24b is connected to a front end of the first portion 24a. Thus, the first branch conductor layer 24 is electrically connected to the signal conductor layer 18. Then, a length of the first branch conductor layer 24 is equal to or less than half the wavelength of the high-frequency signal that is transmitted through the signal conductor layer 18. The first branch conductor layer 24 described above functions as an open stub.

The second branch conductor layer 26 includes a first portion 26a and a second portion 26b. The first portion 26a extends in the front-rear direction. A front end of the first portion 26a is connected to the connection point P0 of the signal conductor layer 18. In the present embodiment, the transmission path length L2 of the high-frequency signal from the overlapping portion P to the connection point P0 is shorter than half the wavelength of the high-frequency signal. That is, the transmission path length L2 of the high-frequency signal from the overlapping portion P to the second branch conductor layer 26 is shorter than half the wavelength of the high-frequency signal. The second portion 26b extends in the right-left direction. A right end of the second portion 26b is connected to a rear end of the first portion 26a. Thus, the second branch conductor layer 26 is electrically connected to the signal conductor layer 18. Then, a length of the second branch conductor layer 26 is equal to or less than half the wavelength of the high-frequency signal that is transmitted through the signal conductor layer 18. The second branch conductor layer 26 as described above functions as an open stub.

Here, lengths of the first portion 24a and the first portion 26a are equal to each other. Lengths of the second portion 24b and the second portion 26b are equal to each other. Thus, assuming viewed in the downward direction (negative direction of the Z-axis), a virtual line L that passes through the overlapping portion P and at which the first branch conductor layer 24 and the second branch conductor layer 26 are line-symmetrical to each other is present. In the present embodiment, the virtual line L extends along the right-left axis. Thus, the signal conductor layer 18 overlaps the virtual line L over the entire length thereof assuming viewed in the downward direction. Then, the signal conductor layer 18 has a shape that is line-symmetric with respect to the virtual line L assuming viewed in the downward direction.

Further, assuming viewed in the downward direction (negative direction of the Z-axis), the radiation conductor layer 17 has a shape that is line-symmetric with respect to the virtual line L. Further, assuming viewed in the downward direction (negative direction of the Z-axis), the ground conductor layer non-forming region A0 extends along the front-rear axis. Thus, assuming viewed in the downward direction (negative direction of the Z-axis), the ground conductor layer non-forming region A0 extends along an axial line orthogonal to the virtual line L. Then, the ground conductor layer non-forming region A0 has a structure that is line-symmetric with respect to the virtual line L.

The radiation conductor layer 17, the signal conductor layer 18, the first ground conductor layer 20, the second ground conductor layer 22, the first branch conductor layer 24, the second branch conductor layer 26, the outer electrode 28, and the annular ground conductor layer 30 are formed by patterning metal foils attached to the upper main surfaces or the lower main surfaces of the insulator layers 16a, and 16d to 16f. The metal foil is, for example, a copper foil.

The interlayer connection conductors v1 to v3 are formed by filling an electrically conductive paste into through holes that penetrate through the insulator layers 16d to 16f along the up-down axis and solidifying the electrically conductive paste by heating and pressing.

Effects

The multilayer substrate 10 can easily adjust the input impedance to the radiation conductor layer 17. More specifically, in the multilayer substrate 10, the first branch conductor layer 24 and the second branch conductor layer 26 are electrically connected to the signal conductor layer 18. Thus, adjusting the shapes of the first branch conductor layer 24 and the second branch conductor layer 26 allows the first branch conductor layer 24 and the second branch conductor layer 26 to function as a matching circuit. As a result, the input impedance to the radiation conductor layer 17 can be easily adjusted.

The multilayer substrate 10 can suppress a reduction in symmetry of radiation characteristics of the radiation conductor layer 17. More specifically, assuming the first branch conductor layer 24 and the second branch conductor layer 26 are provided at the multilayer substrate 10, the radiation characteristics of the radiation conductor layer 17 are affected by the first branch conductor layer 24 and the second branch conductor layer 26. Thus, assuming viewed in the downward direction, the virtual line L that passes through the overlapping portion P and at which the first branch conductor layer 24 and the second branch conductor layer 26 are line-symmetrical to each other is present. That is, the first branch conductor layer 24 and the second branch conductor layer 26 are in a line-symmetrical relationship. Thus, the influence of the first branch conductor layer 24 on a front half of the radiation pattern of the radiation conductor layer 17 and the influence of the second branch conductor layer 26 on a rear half of the radiation pattern of the radiation conductor layer 17 are close to each other. As a result, the multilayer substrate 10 can suppress a reduction in symmetry of the radiation characteristics of the radiation conductor layer 17. Note that for the same reason, the multilayer substrate 10 can suppress a reduction in symmetry of the reception characteristics of the radiation conductor layer 17.

First Modification

Figure 4:
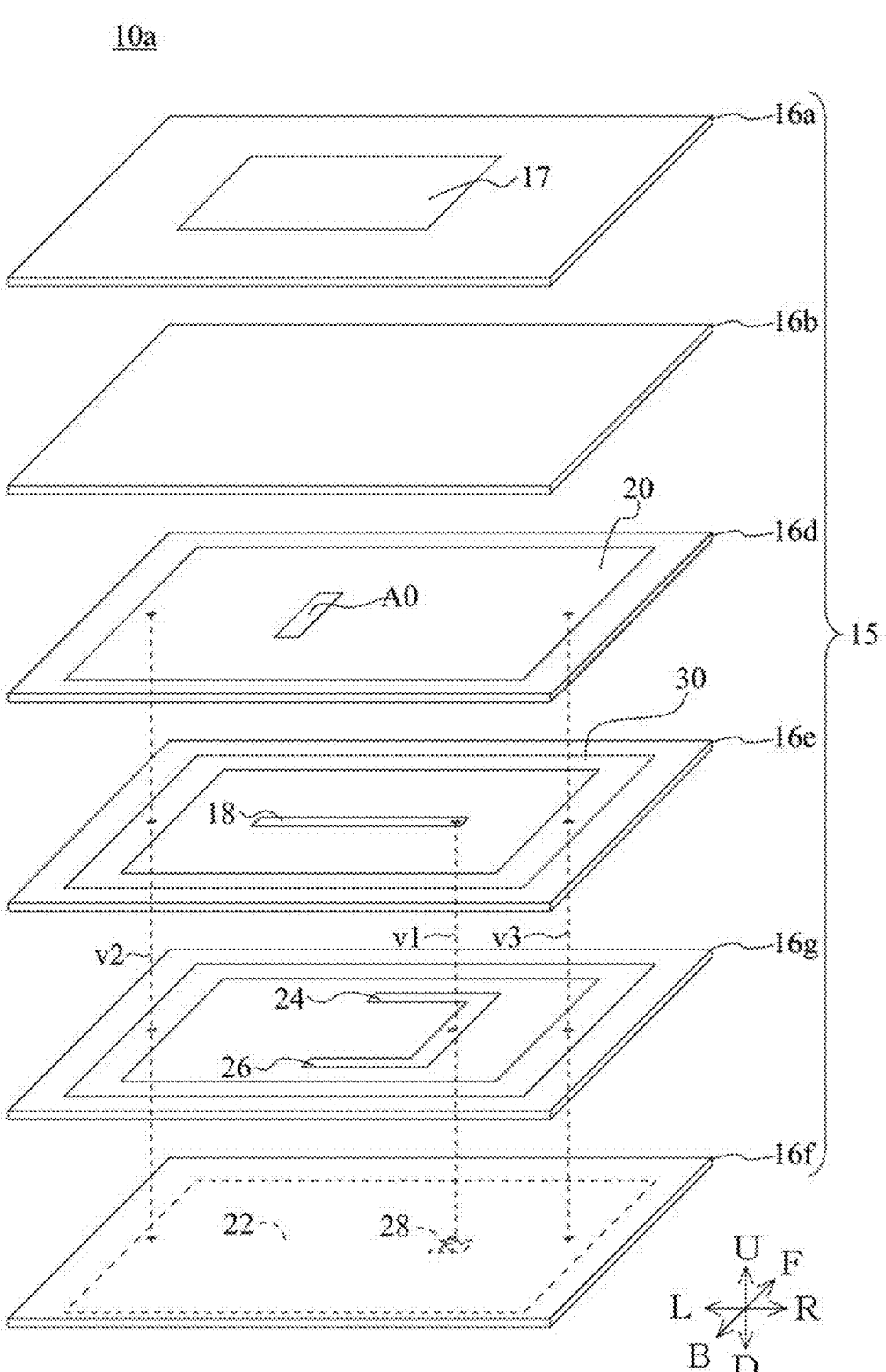

Hereinafter, a multilayer substrate 10a according to a first modification will be described with reference to the drawing. FIG. 4 is an exploded perspective view of the multilayer substrate 10a.

The multilayer substrate 10a is different from the multilayer substrate 10 in that the signal conductor layer 18, and the first branch conductor layer 24 and the second branch conductor layer 26 are located at different insulator layers. More specifically, the signal conductor layer 18 is located on the upper main surface of the insulator layer 16e. The first branch conductor layer 24 and the second branch conductor layer 26 are located on an upper main surface of an insulator layer 16g. The insulator layer 16g is located between the insulator layer 16e and the insulator layer 16f. Thus, the first branch conductor layer 24 and the second branch conductor layer 26 are located below the signal conductor layer 18 (on the negative side of the Z-axis).

The interlayer connection conductor v1 electrically connects the signal conductor layer 18, the first branch conductor layer 24 and the second branch conductor layer 26, and the outer electrode 28. The interlayer connection conductor v1 penetrates through the insulator layers 16e, 16g, and 16f along the up-down axis. The upper end of the interlayer connection conductor v1 is in contact with the right end of the signal conductor layer 18. The lower end of the interlayer connection conductor v1 is in contact with the outer electrode 28. The intermediate portion of the interlayer connection conductor v1 is in contact with the first branch conductor layer 24 and the second branch conductor layer 26. The other structure of the multilayer substrate 10a is the same as that of the multilayer substrate 10, and thus the description thereof is omitted. The multilayer substrate 10a can exhibit the same effect as the multilayer substrate 10.

In the multilayer substrate 10a, the first branch conductor layer 24 and the second branch conductor layer 26 are located below the signal conductor layer 18 (on the negative side of the Z-axis). Thus, the first branch conductor layer 24 and the second branch conductor layer 26 are separated from the radiation conductor layer 17. As a result, the radiation characteristics of the radiation conductor layer 17 are less likely to be affected by the first branch conductor layer 24 and the second branch conductor layer 26.

Second Modification

Figure 5:
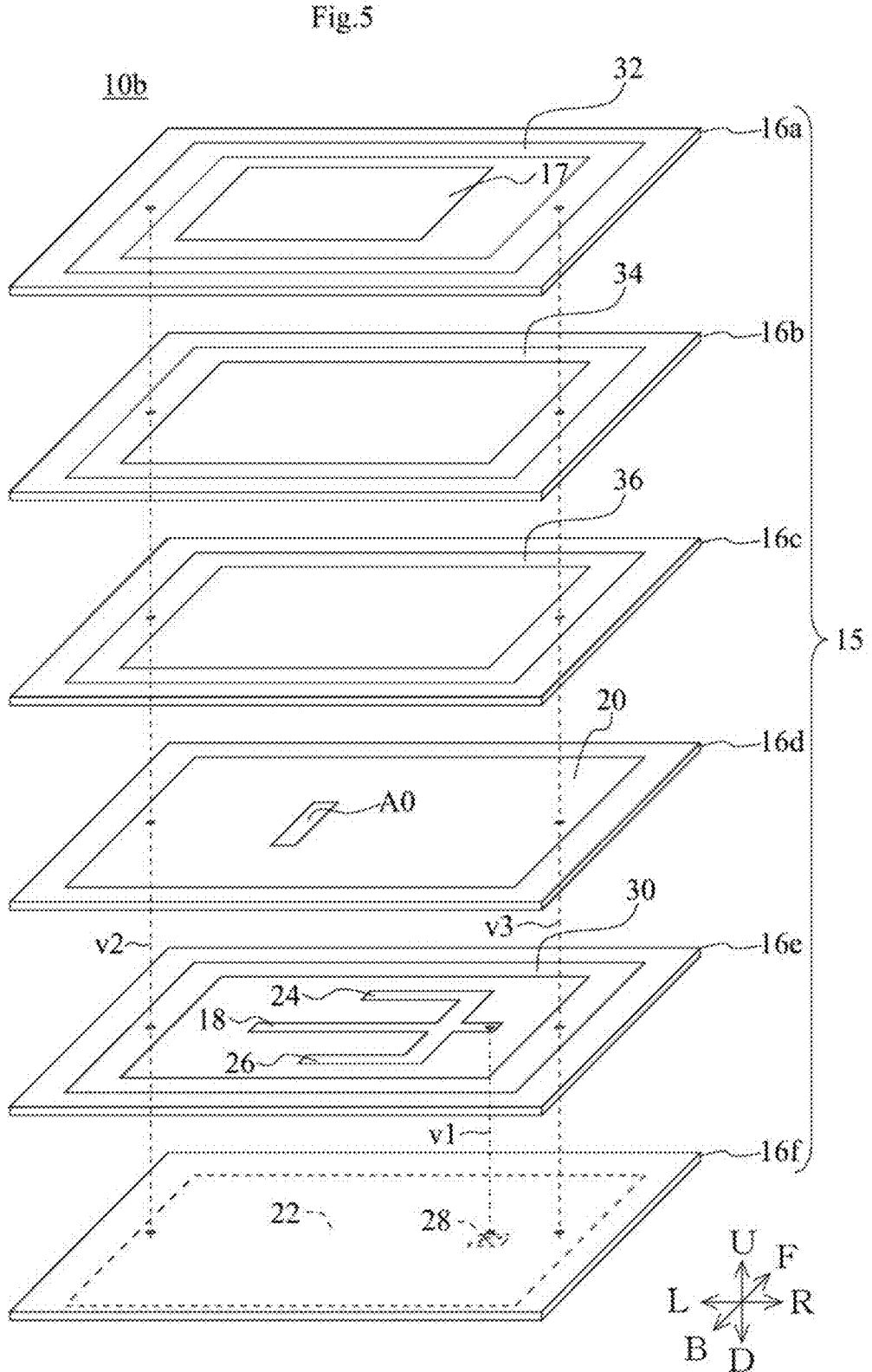
FIG. 5 is an exploded perspective view of a multilayer substrate 10b.

A multilayer substrate 10b according to a second modification will be described below with reference to the drawing. FIG. 5 is an exploded perspective view of the multilayer substrate 10b.

The multilayer substrate 10b is different from the multilayer substrate 10 in that the multilayer substrate 10b further includes annular ground conductor layers 32, 34, and 36. The annular ground conductor layers 32, 34, and 36 are provided at the multilayer body 15. In the present embodiment, the annular ground conductor layer 32 is located on the upper main surface of the insulator layer 16a. The annular ground conductor layer 34 is located on the upper main surface of the insulator layer 16b. The annular ground conductor layer 36 is located on the upper main surface of the insulator layer 16c. Each of the annular ground conductor layers 32, 34, and 36 has a rectangular annular shape assuming viewed in the downward direction. The radiation conductor layer 17, the signal conductor layer 18, the first branch conductor layer 24, and the second branch conductor layer 26 are located within a region surrounded by the annular ground conductor layers 32, 34, and 36 assuming viewed in the downward direction.

The interlayer connection conductors v2 and v3 electrically connect the first ground conductor layer 20, the second ground conductor layer 22, and the annular ground conductor layers 30, 32, 34, and 36. Thus, the annular ground conductor layers 32, 34, and 36 are connected to the ground potential. The other structure of the multilayer substrate 10b is the same as that of the multilayer substrate 10, and thus the description thereof is omitted. The multilayer substrate 10b can exhibit the same effect as the multilayer substrate 10.

In the multilayer substrate 10b, the radiation conductor layer 17, the signal conductor layer 18, the first branch conductor layer 24, and the second branch conductor layer 26 are located in a region surrounded by the annular ground conductor layers 32, 34, and 36 assuming viewed in the downward direction. This suppresses noise invasion into the multilayer substrate 10b and suppresses noise radiation from the multilayer substrate 10b in the front direction, the rear direction, the left direction, and the right direction. In addition, this suppresses capacitance formation of the radiation conductor layer 17, the signal conductor layer 18, the first branch conductor layer 24, and the second branch conductor layer 26 with conductors around the multilayer substrate 10b. Furthermore, since this suppresses the spread of an electromagnetic field radiated from the ground conductor layer non-forming region A0 in the right-left direction, an electric power is efficiently input to the radiation conductor layer 17.

Third Modification

Figure 6:
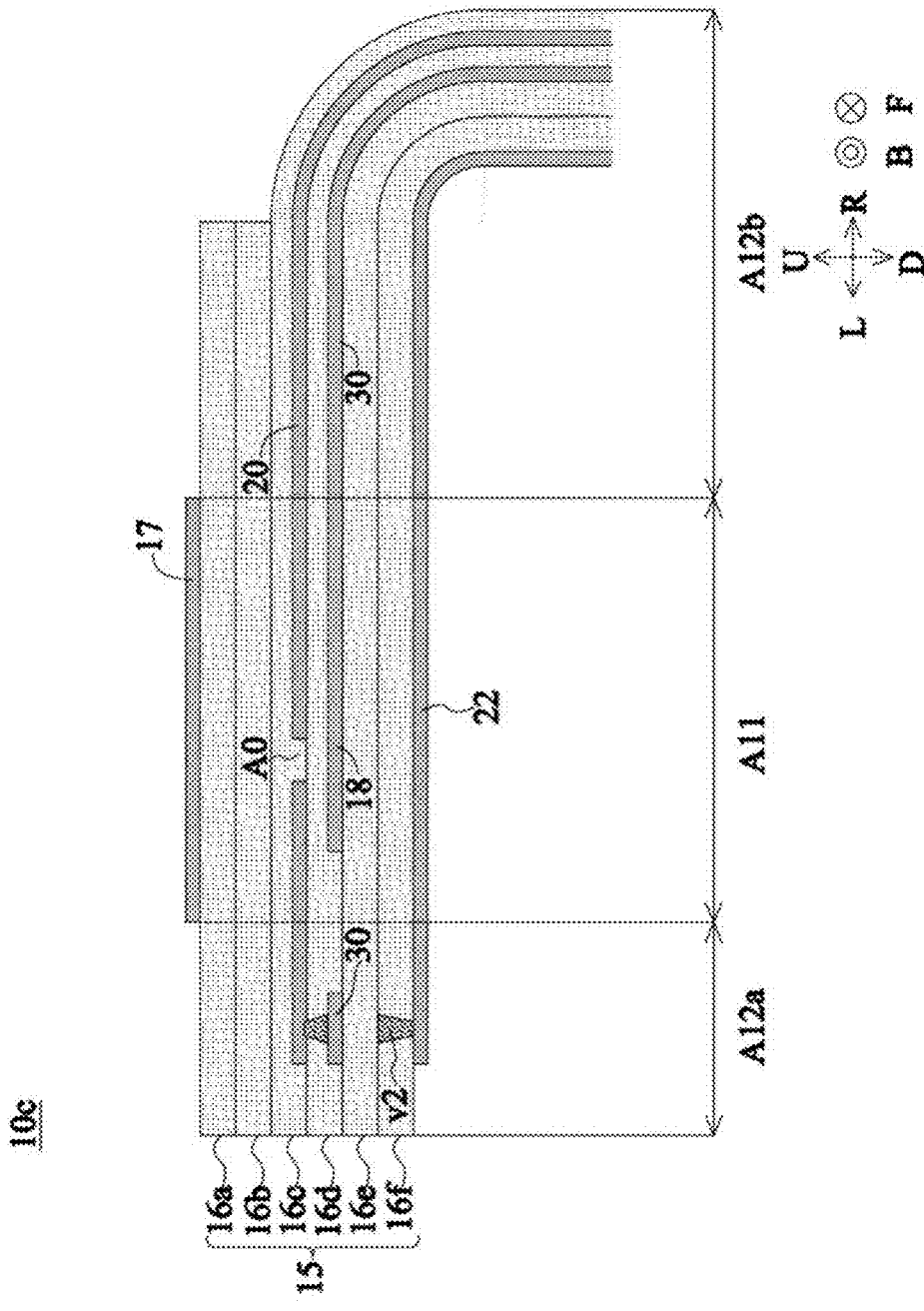
FIG. 6 is a cross-sectional view of a multilayer substrate 10c.

Hereinafter, a multilayer substrate 10c according to a third modification will be described with reference to the drawing. FIG. 6 is a cross-sectional view of the multilayer substrate 10c.

The multilayer substrate 10c is different from the multilayer substrate 10 in that the multilayer body 15 is bent. More specifically, the multilayer body 15 includes a first section A11 in which the radiation conductor layer 17 is provided assuming viewed in the downward direction (negative direction of the Z-axis), and second sections A12a and A12b in which the radiation conductor layer 17 is not provided assuming viewed in the downward direction (negative direction of the Z-axis). A thickness of a portion of the second section A12b in the up-down direction is smaller than a thickness of the first section A11 in the up-down direction. In addition, the second section A12b of the multilayer body 15 includes a bent portion assuming viewed in the front direction (direction orthogonal to the Z-axis). The other structure of the multilayer substrate 10c is the same as that of the multilayer substrate 10, and thus the description thereof will be omitted. The multilayer substrate 10c can exhibit the same effect as the multilayer substrate 10.

Additionally, in the multilayer substrate 10c, a thickness of a portion of the second section A12b in the up-down direction is smaller than the thickness of the first section A11 in the up-down direction. This makes it easy to bend the second section A12b of the multilayer body 15 assuming viewed in the front direction (direction orthogonal to the Z-axis). In addition, the first section A11 and the second section A12b include the insulator layers 16d to 16f. Thus, a connection portion of the signal conductor layer 18 is not generated between the first section A11 and the second section A12b. As a result, the occurrence of loss at the signal conductor layer 18 is suppressed.

Fourth Modification

Figure 7:
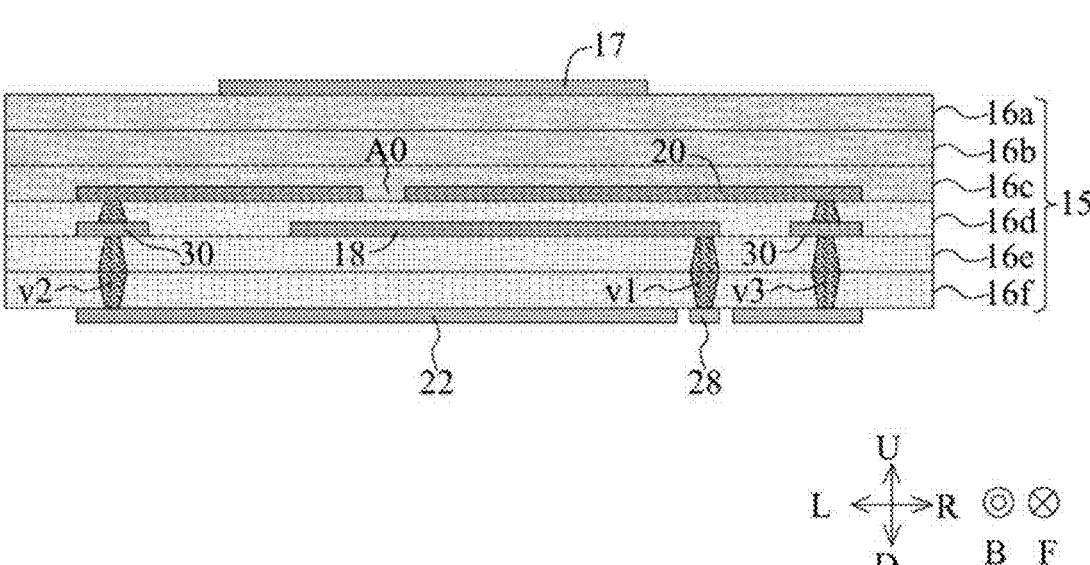
FIG. 7 is an exploded perspective view of a multilayer substrate 10d.

A multilayer substrate 10d according to a fourth modification will be described below with reference to the drawing. FIG. 7 is an exploded perspective view of the multilayer substrate 10d.

The multilayer substrate 10d is different from the multilayer substrate 10 in that a material of the insulator layers 16a to 16c is different from a material of the insulator layers 16d to 16f. A dielectric constant of the insulator layers 16a to 16c is higher than a dielectric constant of the insulator layers 16d to 16f. The other structure of the multilayer substrate 10d is the same as that of the multilayer substrate 10, and thus the description thereof is omitted. The multilayer substrate 10d can exhibit the same effect as the multilayer substrate 10.

In the multilayer substrate 10d, the dielectric constant of the insulator layers 16a to 16c is higher than the dielectric constant of the insulator layers 16d to 16f. Thus, a wavelength shortening effect occurs at the radiation conductor layer 17. As a result, the radiation conductor layer 17 is downsized.

Other Embodiments

The multilayer substrate according to the present disclosure is not limited to the multilayer substrates 10, and 10a to 10d, and can be changed within the scope of the gist thereof. Note that the structures of the multilayer substrates 10 and 10a to 10d may be freely selected and combined.

Note that the number of first ground conductor layers is not limited to one. The number of first ground conductor layers may be one or more. Assuming the number of first ground conductor layers is two, the ground conductor layer non-forming region A0 is formed between the two first ground conductor layers. In this case, the periphery of the ground conductor layer non-forming region A0 is not surrounded by the first ground conductor layer. For example, the first ground conductor layer is not present in front of and behind the ground conductor layer non-forming region A0 assuming viewed in the downward direction.

Note that the dielectric constant of the insulator layers 16a to 16c may be equal to or lower than the dielectric constant of the insulator layers 16d to 16f. In this case, the capacitance between the radiation conductor layer 17 and the first ground conductor layer 20 is reduced. As a result, the gain of the multilayer substrate is improved.

Note that the second ground conductor layer 22, the outer electrode 28, and the annular ground conductor layers 30, 32, 34, and 36 are not essential constituent elements.

Note that the dielectric constant of the insulator layers 16a to 16c may be lower than the dielectric constant of the insulator layers 16d to 16f. In this case, the distance between the radiation conductor layer 17 and the first ground conductor layer 20 is reduced, and thus the thickness of the multilayer substrate 10 in the up-down direction is reduced.

Note that the first branch conductor layer 24 and the second branch conductor layer 26 may be located above the signal conductor layer 18.

Note that the first branch conductor layer 24 and the second branch conductor layer 26 may be located at the left relative to the ground conductor layer non-forming region A0. That is, the connection point P0 may be located between the left end of the signal conductor layer 18 and the overlapping portion P.

Note that the first branch conductor layer 24 and the second branch conductor layer 26 may be short stubs instead of the open stubs. In this case, the first branch conductor layer 24 and the second branch conductor layer 26 are connected to, for example, the annular ground conductor layer 32.

Note that the transmission path length L2 of the high-frequency signal from the overlapping portion P to the first branch conductor layer 24 and the second branch conductor layer 26 may be longer than half the wavelength of the high-frequency signal.

Note that the radiation conductor layer 17 may or may not have a shape that is line-symmetric with respect to the virtual line L assuming viewed in the downward direction.

Note that the signal conductor layer 18 may or may not have a shape that is line-symmetric with respect to the virtual line L assuming viewed in the downward direction.

Note that the ground conductor layer non-forming region A0 may or may not extend along the axial line orthogonal to the virtual line L assuming viewed in the downward direction.

Note that the length L1 of the signal conductor layer 18 between the left end of the signal conductor layer 18 and the overlapping portion P may be larger than half the wavelength of the high-frequency signal that is transmitted through the signal conductor layer 18 assuming viewed in the downward direction.

It should be noted that a length of the ground conductor layer non-forming region A0 in the direction along the front-rear axis may be longer than half the wavelength of the high-frequency signal that is transmitted through the signal conductor layer 18.

Note that each of the multilayer substrates 10, and 10a to 10d may further include one or more branch conductor layers. The one or more branch conductor layers may or may not have a shape that is line-symmetric with respect to the virtual line L assuming viewed in the downward direction. However, the transmission path length from the first branch conductor layer 24 to the overlapping portion P and the transmission path length from the second branch conductor layer 26 to the overlapping portion P are shorter than the transmission path length from the one or more branch conductor layers to the overlapping portion P.

Note that each of the first branch conductor layer 24 and the second branch conductor layer 26 may have a single linear shape or a curved shape assuming viewed in the downward direction.

It should be noted that each of the multilayer substrates 10, and 10a to 10d may further include a third branch conductor layer and a fourth branch conductor layer that are line-symmetrical to each other with respect to the virtual line L.

Note that the first branch conductor layer 24 and the second branch conductor layer 26 may or may not overlap the radiation conductor layer 17 assuming viewed in the downward direction. Thus, the entire first branch conductor layer 24 and the entire second branch conductor layer 26 may overlap the radiation conductor layer 17 assuming viewed in the downward direction, or a portion of the first branch conductor layer 24 and a portion of the second branch conductor layer 26 may overlap the radiation conductor layer 17 assuming viewed in the downward direction.

The present disclosure has the following structure.

(1)

A multilayer substrate comprising:
a multilayer body;
a radiation conductor layer;
one or more first ground conductor layers;
a signal conductor layer;
a first branch conductor layer; and
a second branch conductor layer, wherein
the multilayer body has a structure in which a plurality of insulator layers are laminated along a Z-axis,
the radiation conductor layer is provided at the multilayer body,
the one or more first ground conductor layers are provided at the multilayer body, overlap the radiation conductor layer assuming viewed in a negative direction of the Z-axis, and are located on a negative side of the Z-axis relative to the radiation conductor layer,
the signal conductor layer is provided at the multilayer body, overlaps the radiation conductor layer and the one or more first ground conductor layers assuming viewed in the negative direction of the Z-axis, is located on the negative side of the Z-axis relative to the radiation conductor layer and the one or more first ground conductor layers, and is not electrically connected to the radiation conductor layer,
a ground conductor layer non-forming region in which the one or more first ground conductor layers are not provided is present in a radiation conductor layer region in which the radiation conductor layer is provided assuming viewed in the negative direction of the Z-axis,
the signal conductor layer includes an overlapping portion overlapping the ground conductor layer non-forming region assuming viewed in the negative direction of the Z-axis,
in the ground conductor layer non-forming region, a conductor entirely covering the ground conductor layer non-forming region is not present on a positive side of the Z-axis relative to the signal conductor layer, except for the radiation conductor layer,
the first branch conductor layer and the second branch conductor layer are provided at the multilayer body and are electrically connected to the signal conductor layer, and
assuming viewed in the negative direction of the Z-axis, a virtual line that passes through the overlapping portion and at which the first branch conductor layer and the second branch conductor layer are line-symmetrical to each other is present.

(2)

The multilayer substrate according to (1), wherein the first branch conductor layer and the second branch conductor layer are located on the negative side of the Z-axis relative to the signal conductor layer.

(3)

The multilayer substrate according to (1) or (2), wherein a transmission path length of a high-frequency signal from the overlapping portion to the first branch conductor layer and the second branch conductor layer is shorter than half a wavelength of the high-frequency signal.

(4)

The multilayer substrate according to any one of (1) to (3), wherein the radiation conductor layer has a shape that is line-symmetric with respect to the virtual line assuming viewed in the negative direction of the Z-axis.

(5)

The multilayer substrate according to any one of (1) to (4), wherein the ground conductor layer non-forming region extends along an axial line orthogonal to the virtual line assuming viewed in the negative direction of the Z-axis.

(6)

The multilayer substrate according to any one of (1) to (5), wherein the signal conductor layer includes a first end, and a length of the signal conductor layer between the first end and the overlapping portion assuming viewed in the negative direction of the Z-axis is equal to or less than half a wavelength of a high-frequency signal that is transmitted through the signal conductor layer.

(7)

The multilayer substrate according to any one of (1) to (6), further comprising:

a second ground conductor layer, wherein the second ground conductor layer is provided at the multilayer body, overlaps the radiation conductor layer assuming viewed in the negative direction of the Z-axis, and is located on the negative side of the Z-axis relative to the signal conductor layer.

(8)

The multilayer substrate according to any one of (1) to (7), wherein the multilayer body includes a first section in which the radiation conductor layer is provided assuming viewed in the negative direction of the Z-axis, and a second section in which the radiation conductor layer is not provided assuming viewed in the negative direction of the Z-axis, and the second section of the multilayer body includes a bent portion assuming viewed in a direction orthogonal to the Z-axis.

(9)

The multilayer substrate according to any one of (1) to (8), wherein the signal conductor layer extends along an X-axis, a Y-axis is orthogonal to the X-axis and the Z-axis, and a length of the ground conductor layer non-forming region in a direction along the Y-axis is equal to or less than half a wavelength of a high-frequency signal that is transmitted through the signal conductor layer.

(10)

The multilayer substrate according to any one of (1) to (9), wherein the signal conductor layer extends along an X-axis, a Y-axis is orthogonal to the X-axis and the Z-axis, and the ground conductor layer non-forming region is surrounded by the first ground conductor layer assuming viewed in the negative direction of the Z-axis.

REFERENCE SIGNS LIST 10, 10a to 10d MULTILAYER SUBSTRATE
15 MULTILAYER BODY
16a to 16g INSULATOR LAYER
17 RADIATION CONDUCTOR LAYER
18 SIGNAL CONDUCTOR LAYER
20 FIRST GROUND CONDUCTOR LAYER
22 SECOND GROUND CONDUCTOR LAYER
24 FIRST BRANCH CONDUCTOR LAYER
24a, 26a FIRST PORTION
24b, 26b SECOND PORTION
26 SECOND BRANCH CONDUCTOR LAYER

28 OUTER ELECTRODE
30, 32, 34, 36 ANNULAR GROUND CONDUCTOR LAYER
A0 GROUND CONDUCTOR LAYER NON-FORMING REGION
A1 RADIATION CONDUCTOR LAYER REGION
A11 FIRST SECTION
A12a, A12b SECOND SECTION
L VIRTUAL LINE
P OVERLAPPING PORTION
P0 CONNECTION POINT
v1 to v3 INTERLAYER CONNECTION CONDUCTOR

The invention claimed is:

1. A multilayer substrate comprising:

a multilayer body;

a radiation conductor layer;

one or more first ground conductor layers;

a signal conductor layer;

a first branch conductor layer; and a second branch conductor layer, wherein the multilayer body has a structure in which a plurality of insulator layers are laminated along a Z-axis, the radiation conductor layer is provided at the multilayer body, the one or more first ground conductor layers are provided at the multilayer body, overlap the radiation conductor layer assuming viewed in a negative direction of the Z-axis, and are located on a negative side of the Z-axis relative to the radiation conductor layer, the signal conductor layer is provided at the multilayer body, overlaps the radiation conductor layer and the one or more first ground conductor layers assuming viewed in the negative direction of the Z-axis, is located on the negative side of the Z-axis relative to the radiation conductor layer and the one or more first ground conductor layers, and is not electrically connected to the radiation conductor layer, a ground conductor layer non-forming region in which the one or more first ground conductor layers are not provided is present in a radiation conductor layer region in which the radiation conductor layer is provided assuming viewed in the negative direction of the Z-axis, the signal conductor layer includes an overlapping portion overlapping the ground conductor layer non-forming region assuming viewed in the negative direction of the Z-axis, in the ground conductor layer non-forming region, a conductor entirely covering the ground conductor layer non-forming region is not present on a positive side of the Z-axis relative to the signal conductor layer, except for the radiation conductor layer, the first branch conductor layer and the second branch conductor layer are provided at the multilayer body and are electrically connected to the signal conductor layer, assuming viewed in the negative direction of the Z-axis, a virtual line that passes through the overlapping portion and at which the first branch conductor layer and the second branch conductor layer are line-symmetrical to each other is present, and the connection point between the first branch conductor layer and the second branch conductor layer, assuming viewed in the negative direction of the Z-axis, does not overlap with the ground conductor layer non-forming region.

2. The multilayer substrate according to claim 1, wherein the first branch conductor layer and the second branch conductor layer are located on the negative side of the Z-axis relative to the signal conductor layer.

3. The multilayer substrate according to claim 1, wherein a transmission path length of a high-frequency signal from the overlapping portion to the first branch conductor layer and the second branch conductor layer is shorter than half a wavelength of the high-frequency signal.

4. The multilayer substrate according to claim 1, wherein the radiation conductor layer has a shape that is line-symmetric with respect to the virtual line assuming viewed in the negative direction of the Z-axis.

5. The multilayer substrate according to claim 1, wherein the ground conductor layer non-forming region extends along an axial line orthogonal to the virtual line assuming viewed in the negative direction of the Z-axis.

6. The multilayer substrate according to claim 1, wherein the signal conductor layer includes a first end, and a length of the signal conductor layer between the first end and the overlapping portion assuming viewed in the negative direction of the Z-axis is equal to or less than half a wavelength of a high-frequency signal that is transmitted through the signal conductor layer.

7. The multilayer substrate according to claim 1, further comprising:

a second ground conductor layer, wherein the second ground conductor layer is provided at the multilayer body, overlaps the radiation conductor layer assuming viewed in the negative direction of the Z-axis, and is located on the negative side of the Z-axis relative to the signal conductor layer.

8. The multilayer substrate according to claim 1, wherein the multilayer body includes a first section in which the radiation conductor layer is provided assuming viewed in the negative direction of the Z-axis, and a second section in which the radiation conductor layer is not provided assuming viewed in the negative direction of the Z-axis, and the second section of the multilayer body includes a bent portion assuming viewed in a direction orthogonal to the Z-axis.

9. The multilayer substrate according to claim 1, wherein the signal conductor layer extends along an X-axis, a Y-axis is orthogonal to the X-axis and the Z-axis, and a length of the ground conductor layer non-forming region in a direction along the Y-axis is equal to or less than half a wavelength of a high-frequency signal that is transmitted through the signal conductor layer.

10. The multilayer substrate according to claim 1, wherein the signal conductor layer extends along an X-axis, a Y-axis is orthogonal to the X-axis and the Z-axis, and the ground conductor layer non-forming region is surrounded by the first ground conductor layer assuming viewed in the negative direction of the Z-axis.

11. The multilayer substrate according to claim 2, wherein a transmission path length of a high-frequency signal from the overlapping portion to the first branch conductor layer and the second branch conductor layer is shorter than half a wavelength of the high-frequency signal.

12. The multilayer substrate according to claim 2, wherein the radiation conductor layer has a shape that is line-symmetric with respect to the virtual line assuming viewed in the negative direction of the Z-axis.

13. The multilayer substrate according to claim 2, wherein the ground conductor layer non-forming region extends along an axial line orthogonal to the virtual line assuming viewed in the negative direction of the Z-axis.

14. The multilayer substrate according to claim 2, wherein the signal conductor layer includes a first end, and a length of the signal conductor layer between the first end and the overlapping portion assuming viewed in the negative direction of the Z-axis is equal to or less than half a wavelength of a high-frequency signal that is transmitted through the signal conductor layer.

15. The multilayer substrate according to claim 2, further comprising:

a second ground conductor layer, wherein the second ground conductor layer is provided at the multilayer body, overlaps the radiation conductor layer assuming viewed in the negative direction of the Z-axis, and is located on the negative side of the Z-axis relative to the signal conductor layer.

16. The multilayer substrate according to claim 2, wherein the multilayer body includes a first section in which the radiation conductor layer is provided assuming viewed in the negative direction of the Z-axis, and a second section in which the radiation conductor layer is not provided assuming viewed in the negative direction of the Z-axis, and the second section of the multilayer body includes a bent portion assuming viewed in a direction orthogonal to the Z-axis.

17. The multilayer substrate according to claim 2, wherein the signal conductor layer extends along an X-axis, a Y-axis is orthogonal to the X-axis and the Z-axis, and a length of the ground conductor layer non-forming region in a direction along the Y-axis is equal to or less than half a wavelength of a high-frequency signal that is transmitted through the signal conductor layer.

18. The multilayer substrate according to claim 2, wherein the signal conductor layer extends along an X-axis, a Y-axis is orthogonal to the X-axis and the Z-axis, and the ground conductor layer non-forming region is surrounded by the first ground conductor layer assuming viewed in the negative direction of the Z-axis.

19. The multilayer substrate according to claim 3, wherein the radiation conductor layer has a shape that is line-symmetric with respect to the virtual line assuming viewed in the negative direction of the Z-axis.

20. The multilayer substrate according to claim 3, wherein the ground conductor layer non-forming region extends along an axial line orthogonal to the virtual line assuming viewed in the negative direction of the Z-axis.

* * * * *